(12) United States Patent
Aquino et al.

(10) Patent No.: US 7,541,056 B2
(45) Date of Patent: Jun. 2, 2009

(54) HIGH FIBER AND READY-TO-SERVE, AMBIENT STABLE FRUIT-BASED COMPOSITION

(75) Inventors: Leonardo José Sanchez Aquino, Jersey City, NJ (US); Anthony John Barraclough, Wellingborough (GB); Ian Christopher Chandler, Rushden (GB); Rosemary Antoinette Golden, Franklin Park, NJ (US); Frederik Michiel Meeuse, The Hague (NL); Luis Eduardo Saucedo Pizarro, Metepec (MX); Bernard Charles Sekula, Glen Gardner, NJ (US)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 315 days.

(21) Appl. No.: 10/882,920

(22) Filed: Jul. 1, 2004

(65) Prior Publication Data

US 2006/0003081 A1    Jan. 5, 2006

(51) Int. Cl.
*A23L 1/064* (2006.01)
(52) U.S. Cl. ............... 426/615; 426/321; 426/335; 426/519; 426/520; 426/521
(58) Field of Classification Search ........... 426/615, 426/519, 520, 521, 321, 335
See application file for complete search history.

(56) References Cited

U.S. PATENT DOCUMENTS

| | | | | |
|---|---|---|---|---|
| 2,876,107 | A * | 3/1959 | Pranas et al. | 426/548 |
| 3,958,036 | A | 5/1976 | Latimer et al. | |
| 4,542,033 | A | 9/1985 | Agarwala | |
| 4,612,198 | A * | 9/1986 | Wallin et al. | 426/94 |
| 5,384,147 | A | 1/1995 | Hilpert | |
| 5,840,356 | A | 11/1998 | Swensen | |
| 5,871,794 | A | 2/1999 | Brito | |
| 6,284,303 | B1 | 9/2001 | Rowe et al. | |
| 6,528,104 | B1 | 3/2003 | Jindra et al. | |
| 2002/0168460 | A1 | 11/2002 | Soumya et al. | |
| 2004/0081741 | A1 | 4/2004 | Levi et al. | |
| 2006/0134307 | A1 * | 6/2006 | Sekula et al. | 426/615 |

FOREIGN PATENT DOCUMENTS

| | | | |
|---|---|---|---|
| BE | 897180 | * | 1/1984 |
| EP | 0 931 463 | | 7/1999 |
| EP | 0 931 463 A | | 7/1999 |
| FR | 2 529 445 | | 1/1984 |
| FR | 2 529 445 A | | 1/1984 |
| JP | 361132152 A | * | 6/1986 |
| WO | 02/094037 | | 11/2002 |
| WO | 2004/037017 | * | 5/2004 |
| WO | 2004/112502 | * | 12/2004 |
| WO | 2004/112502 A | | 12/2004 |

OTHER PUBLICATIONS

Gordon, T., 1988 Avocado Recipes, Etc. Morgan Printing &Publishing, Inc. Austin, Texas, p. 19.*
Co-pending application for Sekula et al., U.S. Appl. No. 11/017,289, filed Dec. 20, 2004.
Co-pending application for Levi et al., U.S. Appl. No. 10/281,706, filed Oct. 28, 2002.
Communication Relating to Results of Partial International Search on Application No. PCT/EP2005/006185 dated Sep. 7, 2005.
Carvallo et al., "Formulation of an avocado paste product", FSTA, 1983, XP002262297 (abstract).
Co-pending application for: Applicant: Bialek et al., U.S. Appl. No. 10/693,474, dated Oct. 24, 2003.
Co-pending application for: Applicant: Aquino, U.S. Appl. No. 10/770,242, dated Feb. 2, 2004.
Co-pending application for: Applicant: Sekula et al., U.S. Appl. No. 11/017,289, dated Dec. 20, 2004.
*International Search Report*, PCT/EP2005/006185, mailed Oct. 27, 2005, 3 pp.
Carvallo, et al., "Formulation of an avocado paste product", FSTA, 1983, XP002262297, abstract (*previously submitted*).

* cited by examiner

*Primary Examiner*—Helen F Pratt
(74) *Attorney, Agent, or Firm*—Ellen Plotkin

(57) ABSTRACT

High fiber and ambient stable fruit-based compositions are described. The compositions are ready-to-eat, low in fat and suitable to be beverages, fillings, dips, sauces, spreads or dressings. The compositions have less than 20.0 ppm of extracellular terminal unsaturated ester.

5 Claims, No Drawings

HIGH FIBER AND READY-TO-SERVE, AMBIENT STABLE FRUIT-BASED COMPOSITION

FIELD OF THE INVENTION

The present invention is directed to a high fiber, and ready-to-serve ambient stable fruit-based composition. More particularly, the invention is directed to a high fiber and ready-to-serve ambient stable fruit-based composition having an extended fruit base. The fruit-based composition of this invention is low in fat, substantially free of starch, and suitable to be a beverage, filling, dip, sauce, spread, dressing or the like. The fruit-based composition of this invention can be prepared from ripened and/or over ripened fruit, and is ambient stable for at least about eight (8) weeks after opening.

BACKGROUND OF THE INVENTION

Consumption of nutrients, like antioxidants and folic acid, which are abundant in fruits and vegetables, has been linked to a lower incidence of cardiovascular disease. Moreover, it is well settled that eating fruits high in soluble fiber can reduce cholesterol levels which protects against atherosclerosis.

Other advantages of having a diet high in fruit include better athletic performances, reduced risk of developing chronic bronchitis, a lowered risk of getting most common cancers (including breast cancer), as well as a lowered risk of getting cataracts. Additionally, fruits, like avocado, are high in protein, vitamin E, C, and beta-carotene and may be linked to stroke prevention.

While food products comprising fruits and vegetables have been linked to health benefits in humans, such products are often difficult to prepare for sale in commerce. This is true because the quality of food products comprising fruit often deteriorates (e.g., browns, darkens, grows mold and/or loses flavor) due to enzymatic reactions within the food product, thereby resulting in a product that has a short shelf life and does not have an appealing look or taste after spending a limited period of time in conventional commercial channels.

Known techniques have been used to inhibit the deterioration of food products comprising fruits and/or vegetables. These known techniques include pasteurization of the fruit, high vacuum processing for removing oxygen, and chemically treating the fruit with sulfiting agents before making the food product. The above-described known techniques do not eliminate, for example, browning and darkening in food products comprising fruit, and such techniques have adverse effects on the flavor, aroma, texture and nutritional value of the fruits and vegetables treated, as well as the food products prepared therefrom.

It is of increasing interest to develop a ready-to-serve and ambient stable fruit-based composition that does not, for example, easily brown, darken and lose flavor and that has an extended shelf life at ambient temperature. This invention, therefore, is directed to a ready-to-serve and ambient stable fruit-based composition that has not been subjected to chemical treatment, high vacuum processing and temperatures over about 85° C. The ready-to-serve ambient stable fruit-based composition of this invention is low in fat, substantially free of starch, and suitable to be a beverage, filling, dip, sauce, spread, dressing or the like. Moreover, the ready-to-serve ambient stable fruit-based composition of this invention can be prepared from under ripe, ripened and/or over-ripened fruit and is ambient stable for at least about eight (8) weeks after opening. Such a fruit-based composition has substantially the same visual, texture, aroma and taste attributes of a fruit-based composition made on demand from freshly picked fruits.

ADDITIONAL INFORMATION

Efforts have been disclosed for making fruit pulp. In U.S. Pat. No. 5,384,147, a method for processing avocado pulp is described.

Other efforts have been disclosed for making stabilized fruit. In U.S. Pat. No. 5,871,794, a guacamole composition with tomatillo pulp is described.

Still other efforts have been disclosed for making creamy food formulations. In U.S. Pat. No. 6,284,303, a vegetable based creamy food is described.

None of the additional information above describes a ready-to-serve and ambient stable fruit-based composition that has not been subjected to chemical treatment, high vacuum processing and temperatures that exceed about 85° C. Moreover, none of the additional information describes a ready-to-serve, ambient stable fruit-based composition that can be made from under ripe, ripened and/or over ripened fruit.

SUMMARY OF THE INVENTION

In a first aspect, the present invention is directed to an acidified fruit composition comprising:
fruit;
water; and
acidulant wherein the acidified fruit composition has a pH below about 3.8 and extracellular terminal unsaturated ester level below about 20.0 ppm.

In a second aspect, the present invention is directed to an extended fruit base comprising the acidified fruit composition of the first aspect of this invention.

In a third aspect, the present invention is directed to a ready-to-serve and ambient stable fruit-based composition comprising the extended fruit base of the second aspect of this invention.

In a fourth aspect, the present invention is directed to a method for making the ready-to-serve and ambient stable fruit-based composition of the third aspect of this invention.

Low in fat, as used herein, means less than about 40.0%, and preferably, less than about 25.0% by weight of the total weight of the ready-to-serve and ambient stable fruit-based composition but at least about 5.0% by weight of the total weight of the composition. Ambient stable, as used herein, means microbiologically stable (i.e., no outgrowths of bacteria, yeast and/or mold) and no flavor loss for at least about eight (8) weeks after opening, and preferably, for at least about twenty (20) weeks after opening when kept covered at ambient temperature.

Ambient stable also means that the fruit-based composition displays no browning, darkening, flavor change or separation (i.e., creaming) for at least about eight (8) weeks after opening when kept covered at ambient temperature. Ripened fruit, as used herein, means a fruit that is sufficiently advanced and mature. Over ripe fruit means fruit that is softer and often sweeter than ripe fruit. Terminal unsaturated ester means an ester with its fatty acid portion terminated with an $sp^2$ bond, or an ester with its fatty acid portion terminated with an sp bond, or a mixture thereof. Extended fruit base means a composition comprising fruit and insoluble fibers suitable to be flavored to taste with optional additives. Ready-to-serve means flavored with optional additives and ready for consumption by a consumer. High fiber means at least 2.0% by weight fiber based on total weight of the ready-to-serve and ambient stable fruit-composition. Extracellular means external or released from its host (i.e., carrying) cell. Chemical treating means reacting with and not merely mixing fruit with commonly employed food grade acids. Substantially free of starch means less than 3.8 percent by weight starch based on total weight of the ready-to-serve and ambient stable fruit composition, but preferably, no starch.

DETAILED DESCRIPTION OF THE PREFERRED EMBODIMENTS

There is no limitation with respect to the type of fruit that may be used to make the ready-to-serve, ambient stable fruit-based composition of the present invention, as long as the fruit is one that is suitable for human consumption. Often, the fruit used in this invention is an avocado, banana, mango, guava, fig, papaya, kiwi, star fruit, pineapple, combination thereof, or the like. In a most preferred embodiment, the fruit employed in this invention is avocado.

When selecting the fruit to make the acidified fruit composition of this invention, the fruit can be utilized under ripe, ripe, over ripe or as a mixture thereof, but preferably ripe.

When preparing the fruit selected for use in this invention, the ripe or over ripe fruit or mixture thereof is, in no particular order, peeled and depitted or cored, if necessary. The resulting fruit flesh can be acidified after being combined with insoluble fiber, but preferably, the resulting fruit flesh is acidified then mashed or mashed then acidified to produce an acidified fruit composition (before insoluble fiber is added). In a most preferred embodiment, the mashed fruit flesh is first pureed, and subsequently, acidified in a mixing vessel, preferably operating at moderate shear, to produce the acidified fruit composition. The amount of acid employed is such that the pH of the acidified fruit composition is below about 3.8, and preferably, below about 3.65, and most preferably, below about 3.5. In yet another preferred embodiment, the pH of the acidified fruit composition is above about 2.75 but below 3.8, including all ranges subsumed therein.

In addition to the above mentioned pH values, the acidified fruit composition (regardless of the means for acidifying) has extracellular terminal unsaturated ester at a level below about 20.0 ppm, and preferably, below about 5.0 ppm, and most preferably, about 0.0 ppm (resulting, from the acidification and moderate stirring as well as heat treatment when employed). In a most preferred embodiment, the extracellular terminal unsaturated ester is avocatin.

The acidulants suitable to acidify the fruit flesh used in this invention are limited only to the extent that they may be used in a product suitable for human consumption. Examples of the types of acidulants that may be used in this invention are acetic acid, hydrochloric acid, lactic acid, malic acid, phosphoric acid, mixtures thereof, and the like.

In a preferred embodiment, the acidulant employed in this invention is hydrochloric or phosphoric acid. In yet another preferred embodiment, the amount of acid employed in this invention is, by weight, about 60.0 to about 90.0 times, and preferably about 70.0 to about 80.0 times less than the weight of fruit employed in the ready-to-serve and ambient stable fruit-based composition.

When making the extended fruit base described herein, fruit can be combined with insoluble fiber (i.e., water insoluble) and acid and/or acidified insoluble fiber. Preferably, however, acidified fruit composition is combined with insoluble fiber. The insoluble fibers suitable for use in this invention are found, for example, in fruits, both citrus and non-citrus. Other sources of the insoluble fibers suitable for use in this invention are vegetables like legumes, and grains. Preferred insoluble fibers suitable for use in this invention can be recovered from tomatoes, peaches, pears, apples, plums, lemons, limes, oranges, grapefruits or mixtures thereof. Other preferred insoluble fibers suitable for use in this invention may be recovered from the hull fibers of peas, oats, barley, mustard, soy, or mixtures thereof. Still other fibers which may be employed include those that are plant or root-derived as well as those which are wood-derived. Typically, the ready-to-serve and ambient stable fruit-based composition of this invention comprises from about 0.10% to about 5.0%, and preferably, from about 0.15% to about 4.5%, and most preferably, from about 0.25% to about 4.0% by weight insoluble fibers, based on total weight of the ready-to-serve and ambient stable fruit-based composition, and including all ranges subsumed therein. Such insoluble fibers are commercially available from suppliers like J. Rettenmaier and Sohne GMBH under the Vitacel name and Herbstreith & Fox under the Herbacel name. These insoluble fibers typically have lengths from about 25 to about 400 microns, and preferably, from about 50 to 185 microns, and most preferably, from about 100 to about 165 microns, including all ranges subsumed therein. The widths of such fibers are typically between about 3.0 to about 20.0 microns, and preferably, from about 5.0 to about 10.0 microns.

Also, preferably added to the extended fruit base of this invention is oil, emulsifier and thickener. The oil used to make the extended fruit base of this invention is limited only to the extent that it is suitable for human consumption. Illustrative examples of the types of oil which may be used in this invention include, without limitation, those which are liquid at ambient temperature like avocado, mustard, coconut, cottonseed, fish, flaxseed, grape, olive, palm, peanut, rapeseed, safflower, sesame, soybean, sunflower, mixtures thereof and the like.

Other types of oils which may be used (either alone or in combination with the oils that are liquid at ambient temperature) in this invention are solid at ambient temperature. Illustrative examples of the oils which are solid at room temperature and suitable for use in this invention include, without limitation, butter fat, chocolate fat, chicken fat, coconut oil, partially or fully hydrogenated vegetable oils like palm kernel oil and soybean oil, mixtures thereof and the like.

In a preferred embodiment, the oil used in this invention is a liquid at ambient temperature. In a most preferred embodiment, the oil used in this invention is soybean, sunflower or rapeseed oil or a mixture thereof.

The amount of oil used in the ready-to-serve and ambient stable fruit-based composition of this invention is typically more than about 5.0% by weight and less than about 40.0% by weight, based on total weight of the ready-to-serve and ambient stable fruit-based composition and including all ranges subsumed therein. Preferably, the amount of oil employed in the ready-to-serve and ambient stable food composition is from about 1.0% to about 40.0%, and most preferably, from about 5.0% to about 30.0% by weight, based on total weight of the ready-to-serve and ambient stable fruit-based composition and including all ranges subsumed therein. Fruit (not including the optionally added fruit) typically makes up from about 10.0% to about 40.0%, and preferably, from about 15.0% to about 35.0% by weight of the total weight of the ready-to-eat and ambient stable fruit-based composition.

It is noted that in lieu of oil or in combination with oil, conventional fat substitutes may be used. Preferred fat substitutes employable in this invention include fatty acid-esterified alkoxylated glycerin compositions as well as sucrose fatty acid esters. The former and latter are described in U.S. Pat. Nos. 5,516,544 and 6,447,824, respectively, the disclosures of which are incorporated herein by reference. When employed, such conventional fat substitutes preferably make up at least about 30.0%, and most preferably, at least about 75.0% of the total weight of the oil in the emulsion produced.

The water used in this invention can be pure water, tap water, bottled water, deionized water, spring water, or a mixture thereof. Thus, the water used in this invention may be an aqueous solution comprising salts or minerals or both. The water in the compositions described herein can be an additive and/or supplied with ingredients, like fruit. Typically, water makes up the balance of the ready-to-serve and ambient stable fruit-based composition of this invention.

The emulsifier that may be used in the ready-to-serve and ambient stable fruit-based composition of this invention often has an HLB of greater than about 9.0, and preferably, greater than about 11.0, and most preferably, from about 12.0 to about 18.0, including all ranges subsumed therein. Examples of the emulsifier suitable for use in this invention include PEG 20 tristearate, PEG 20 trioleate, PEG 20 monostearate, PEG 20 monooleate, PEG 20 monopalmitate and PEG 20 monolaurate sorbitan, derivatives thereof, mixtures thereof and the like, all made commercially available by ICI Surfactants under the names Tween or Span.

Other emulsifiers that may be used in this invention include nonionic copolymers of ethylene oxide and propylene oxide made available under the name Pluronic by BASF AG. Even other emulsifiers that may be used in this invention include lecithin and mono- and diglycerides, as well as polyglycerol polyricinoleate (PGPR). Still other emulsifiers employable in this invention are polysorbate 60, or a phospholipid, and especially, egg yolk derived phospholipids modified with a phospholipase (e.g., lecitase from Novo Nordisk) as disclosed in U.S. Pat. Nos. 5,028,447, 6,277,430, the disclosures of which are incorporated herein by reference. Suppliers of such phospholipids are, for example, M.G. Waldbaum Company and Inova Food Ingredients.

The amount of emulsifier employed in the extended fruit base of this invention is enough to typically yield a ready-to-serve and ambient stable fruit-based composition comprising from about 0.01 to about 2.0%, and preferably, from about 0.05% to about 1.0%, and most preferably, from about 0.2% to about 0.75% by weight emulsifier, based on total weight of the ready-to-serve and ambient stable fruit-based composition, and including all ranges subsumed therein. The preferred emulsifiers for use in this invention are polysorbate 60, a monostearate, lecithin or a mixture thereof.

Illustrative examples of the types of thickeners suitable for use in this invention include cellulose, locust bean, xanthan, carrageenan, guar gum, pectin, mixtures thereof and the like. Xanthan is the preferred thickener and typically thickeners make up from about 0.02% to about 1.0% by weight of the total weight of the ready-to-serve and ambient stable fruit-based composition, including all ranges subsumed therein.

The extended fruit base of this invention may be combined with optional additives to make the ready-to-serve and ambient stable fruit-based composition of this invention. Preferred optional additives which may be employed in this invention include mustard flour, chocolate, nut paste, salt, celantro (and other spices and seasonings), vitamins, natural and artificial flavors (like those made available by Givaudan and/or International Flavors and Fragrances) and natural and artificial colors (e.g., beta carotene) fruit juice, preservatives, antioxidants, chelators, meat like ham and bacon bits or particulates, buffering agents, vegetable chunks, puree, bits or particulates, fruit chunks, puree, bits or particulates, cheese, mixtures thereof and the like. Such optional additives, when used, collectively, usually do not make up more than about 65.0% by weight of the total weight of the ready-to-eat and ambient stable fruit-based composition.

The preferred preservatives suitable for use in this invention include sodium benzoate, potassium benzoate, potassium sorbate, sorbic acid, benzoic acid, mixtures thereof and the like. Anti-oxidants suitable for use in this invention include a tocopherol, ascorbic acid, ascorbyl palmitate, tertiary-butyl hydroquinone, mixtures thereof and the like. Chelators suitable for use in this invention include EDTA and its salts, citric acid, sodium tripolyphosphate, sodium carbonate, potassium carbonate, mixtures thereof and the like.

The fruit and vegetable chunks, puree, particulates or bits that may be used in this invention are typically small enough to fit through the orifice present in a conventional squeeze bottle. The vegetables often include peppers, carrots, cabbage, onion, garlic, broccoli, mixtures thereof and the like. The fruits often include avocado, pears, apples, grapes, tomatoes, mixtures thereof and the like.

In a preferred embodiment, the ready-to-serve and ambient stable fruit-based composition of this invention comprises from about 10.0% to about 40.0% by weight pureed and/or chopped tomatillo, and about 1.0% to about 20.0% by weight pureed and/or chopped jalapeno pepper. In an especially preferred embodiment, optional additives, like onions, that will absorb water soluble colors are pureed.

Still other additives which may be optionally added to make the ambient stable and ready-to-eat fruit-based composition of this invention include protein sources and sweeteners. The former include caseinate, whey, fractionated milk proteins, and skimmed milk powder and the latter include syrups, sucrose, glucose, saccharin, aspartame, dextrose, lactose, levelose, maltose, fructose, mixtures thereof and the like.

When making the acidified fruit composition of this invention, again, fruit may be combined with acid, acid and insoluble fiber and/or acidified insoluble fiber. Regardless of the means of acidifying, fruit flesh is mixed with acid to yield an acidified fruit composition having a pH below about 3.8 and a level of extracellular terminal unsaturated ester below about 20.0 ppm (resulting from the pH, and controlled moderate stirring and heating step when employed). Preferably, fruit flesh is directly mixed with acid.

The extended fruit base of this invention is prepared by making a composition comprising acid, insoluble fiber and fruit flesh. Oil may be added to the fruit flesh prior to adding insoluble fiber. In a preferred embodiment, oil is added to the insoluble fibers prior to adding fruit flesh. In a most preferred embodiment, oil is added to the insoluble fibers before or after water has been combined with the fibers. Emulsifier is also added to the insoluble fibers either before, with or after the addition of oil, but preferably before the addition of oil. Fat soluble additives (like flavors) can be added to the oil phase and water soluble additives like sugar, salt and preservatives can be added to the aqueous phase (along with thickeners) before the two phases are mixed to form a pre-emulsion or coarse emulsion. In an especially preferred embodiment, the oil with fat soluble additives is mixed with insoluble fibers, water and water soluble additives to produce a coarse emulsion. The coarse emulsion can then be subjected to a colloid mill or homogenizer to produce a smooth emulsion.

When homogenized, the homogenization step is typically carried out under pressures from about 20.0 to about 650.0 bar, and preferably, from about 40.0 to about 600.0 bar, and most preferably, from about 45.0 to about 550.0 bar, including all ranges subsumed therein. Typically, such a homogenization step is carried out at a temperature from about 15.0° C. to about 70° C. (preferably about ambient temperature) and for enough time to produce oil droplets whereby at least about 80.0% of the total amount of oil droplets formed in the resulting oil-in-water emulsion have a diameter which is less than about 10.0 microns. In a preferred embodiment, at least about 85.0% of the total amount of oil droplets present have a diameter which is less than about 8.0 microns. In an especially preferred embodiment, at least about 95.0% by weight of all oil droplets present have a diameter which is less than about 5.0 microns.

Fruit flesh not having the preferred optional additives can be added (preferably in acidified form) to the smooth emulsion, resulting in the extended fruit base of this invention. When the desired optional additives are subsequently combined with the extended fruit base (e.g., jalapeno peppers, tomatillo), the resulting composition is a ready-to-eat fruit-based composition whereby the same is most preferably, a ready-to-eat guacamole composition. In an especially preferred embodiment, the ready-to-eat fruit-based composition is heated, for example, in heat exchangers like the Votators made available from Cherry Burrell. The ready-to-eat fruit-based composition (when having a pH greater than about 3.3, and optionally, when having a pH less than about 3.3) is heated for about 30.0 seconds to about 8.0 minutes, but preferably for about 2.0 minutes to about 4.0 minutes, including all ranges subsumed therein to render the same ambient stable. In a preferred embodiment, the temperature in the heat exchanger is from about 65° C. to a temperature that does not exceed about 85° C. In a most preferred embodiment, the heat exchanger is a scrape surface type, and the heating occurs for about 2.0 to about 4.0 minutes at a temperature from about 75.0° C. to about 80.0° C. In another most preferred embodiment, the pH of the ready-to-eat and ambient stable fruit-based composition is from about 2.00 to about 3.75.

It is also within the scope of this invention to heat the fruit not being supplied as optional additive in lieu of the ready-to-eat fruit composition when the resulting ready-to-eat and ambient stable fruit composition has pH above about 3.3. Such heating of the fruit is optional when the pH of the resulting ready-to-eat and ambient stable fruit-based composition is less than about 3.3.

In still another preferred embodiment, substantially no active enzymes (i.e., all quality detrimental enzymes like amylase, lipoxyginase, polyphenol oxidase) are present in the ready-to-eat and ambient stable fruit-based composition.

The packaging for the ready-to-eat and ambient stable fruit-based composition of this invention is often a glass jar, food grade sachet or squeezable plastic bottle. Sachets are preferred for food service solutions, and a glass jar is preferred for domestic use. In a preferred embodiment the packaging is filled cold, and most preferably, aseptically.

The viscosity of the ready-to-serve and ambient stable fruit composition of this invention is typically greater than about 3,000 and less than about 150,000 centipoise. When a beverage, sauce or pourable dressing is, for example, the desired composition, the viscosity of the composition is preferably from about 4,000 to about 10,000 centipoise, and most preferably, from about 4,350 to about 6,000 centipoise.

When the desired ready-to-serve and ambient stable food composition is, for example, a filling, dip, spread or spoonable dressing, the viscosity of the food product is preferably from about 12,000 to about 120,000 centipoise, and most preferably, from about 16,000 to about 80,000 centipoise, whereby the viscosity of the composition is measured on a Haake Rheometer (Rotovisco RV20) at room temperature using a set of concentric cylinders (or bob-in-cup) with a 1 mm gap, the bob having a diameter of 1.0 cm and length of 1.0 cm. The inner cylinder or bob starts rotating from 0 shear and ramps up to a shear rate of 134 sec$^{-1}$ in 542 sec. By way of comparison, the viscosity values refer to the shear rate of 10 sec$^{-1}$.

EXAMPLE 1

Ready-to-eat and ambient stable guacamole compositions were made by mixing the following ingredients:

TABLE 1

| Ingredient | Percent by Weight based on total weight of the Ready-to-eat guacamole composition |
|---|---|
| A. | |
| Soybean oil | 6.0-12.0 |
| Partially hydrogenated soybean oil | 0.0-5.0 |
| B. | |
| Water | Balance |
| Pectin | 0.02-0.04 |
| Sorbic Acid | 0.08-0.12 |
| Citrus fiber | 1.20-2.0 |
| Monostearate | 0.0-0.12 |
| Lecithin | 0.0-0.055 |
| Polysorbate 60 | 0.1-0.2 |
| Xanthan gum | 0.05-0.2 |
| Corn syrup | 0.05-0.2 |
| EDTA | 0.0065-0.0075 |
| Color | 0.045-0.055 |
| C. | |
| Avocado flesh | 26.0-27.0 |
| Flavor | 0.5-1.3 |
| Tomatillo | 26.0-27.0 |
| Onion, puree | 2.0-4.0 |
| Diced jalapeno | 4.5-5.5 |
| Cilantro | 0.05-0.09 |
| Garlic, puree | 0.30-0.40 |
| Lime juice | 0.08-0.10 |
| Phosphoric acid | * |

* to pH of about 3.5 to 3.7.

Phases (A) and (B) were combined and mixed under moderate shear at atmospheric pressure and ambient temperature in a conventional mixer to produce coarse emulsions. The coarse emulsions were then subjected to a homogenizer (e.g., APV Gaulin Homogenizer) pressurized to about 200 bar and at about 45° C. The resulting smooth emulsions were combined with the acidified avocado flesh (i.e., acidified fruit compositions) of Phase C to produce extended fruit bases. Added to the extended fruit bases were the remainder of the ingredients identified in Phase C. After moderate mixing, the resulting compositions were heated in a scrape surface heat changer for about three (3) minutes at about 80° C. The resulting compositions were the ready-to-eat and ambient stable guacamole compositions of this invention (pH about 3.5).

EXAMPLE 2

The ready-to-eat and ambient stable guacamole compositions of Example 1 were compared to guacamole compositions not subjected to the heat and acid treatments defined in this invention. Surprisingly, after about eight (8) weeks, the former looked fresh, were not rancid or brown and tasted substantially the same as freshly made guacamole. The latter was not edible.

What is claimed is:

1. An extended fruit base comprising:
   (a) avocado fruit; and
   (b) insoluble fiber; wherein the insoluble fiber is citrus fiber;
   (c) oil;
   (d) emulsifier;
   (e) phosphoric acid;
   wherein the fruit base has a pH below about 3.8;
   wherein the fruit has an extracellular terminal unsaturated ester level below about 20.0 ppm;
   wherein said base is substantially free of starch; and
   wherein said fruit base is ready-to-serve.

2. The extended fruit base according to claim 1 wherein the fruit further comprises banana, mango, guava, fig, papaya, kiwi, star fruit, pineapple, or a mixture thereof.

3. A ready-to-serve and ambient stable fruit-based composition comprising:
   (a) avocado fruit;
   (b) oil; and
   (c) insoluble fiber;
   (d) 10.0% to about 40.0% by weight tomatillo; and
   (e) about 1.0% to about 20.0% by weight jalapeno pepper;
   (f) an emulsifier and water forming an oil-in-water emulsion;
   wherein the fruit has an extracellular terminal unsaturated ester level below about 20.0 ppm;
   wherein said composition is substantially free of starch; and
   wherein said composition is ready-to-serve.

4. A method for making a ready-to-serve and ambient stable fruit composition comprising the steps of:
   (a) homogenizing a composition comprising insoluble fiber, water and oil to produce a homogenized emulsion; and
   (b) combining avocado fruit flesh with the homogenized emulsion wherein the fruit flesh has an extracellular terminal unsaturated ester level below about 20.0 ppm; wherein the extracellular terminal unsaturated ester is avocatin; wherein the fruit flesh is acidified to a pH below about 3.8; and
   wherein said composition is substantially free of starch.

5. A method for making a ready-to-serve and ambient stable fruit-based composition comprising the steps of:
   (a) homogenizing a composition comprising insoluble fiber, water and oil to produce a homogenized emulsion;
   (b) combining avocado fruit flesh with the homogenized emulsion; and
   (c) heating the fruit flesh or the resulting composition to a temperature that does not exceed about 85° C. for about 30.0 seconds to about 8.0 minutes when the ready-to-eat and ambient stable fruit-based composition has a pH greater than about 3.3;
   wherein said fruit flesh or the resulting composition has an extracellular terminal unsaturated ester level below about 20.0 ppm; and
   wherein said fruit-based composition is substantially free of starch.

* * * * *